United States Patent [19]

Nonaka et al.

[11] Patent Number: 5,051,766
[45] Date of Patent: Sep. 24, 1991

[54] AUTOMATIC FOCUSING CAMERA WITH MULTIPLE DISTANCE MEASURING FUNCTION

[75] Inventors: Osamu Nonaka, Sagamihara; Yasuyuki Kawabe, Nagano; Atushi Maruyama, Yokohama; Tatsuji Higuchi, Akikawa, all of Japan

[73] Assignee: Olympus Optical Co., Ltd., Tokyo, Japan

[21] Appl. No.: 504,540

[22] Filed: Apr. 4, 1990

[30] Foreign Application Priority Data

Apr. 14, 1989 [JP] Japan ................................. 1-94381

[51] Int. Cl.[5] .......................................... G03B 13/36
[52] U.S. Cl. ................................... 354/400; 354/402; 354/403; 354/407
[58] Field of Search ............... 354/400, 402, 403, 407, 354/408

[56] References Cited

U.S. PATENT DOCUMENTS

| | | |
|---|---|---|
| 4,470,681 | 9/1984 | Johnson . |
| 4,571,048 | 2/1986 | Sugawara ........................ 354/403 |
| 4,614,418 | 9/1986 | Ishizaki et al. ..................... 354/407 |
| 4,720,723 | 1/1988 | Harunari et al. .................... 354/402 |
| 4,792,819 | 12/1988 | Akashi ............................. 354/400 |
| 4,827,303 | 5/1989 | Tsuboi . |
| 4,829,331 | 5/1989 | Aihara ............................. 354/400 |
| 4,855,585 | 8/1989 | Nonaka . |
| 4,878,080 | 10/1989 | Takehana et al. .................. 354/403 |
| 4,943,824 | 7/1990 | Nabeshima et al. ................ 354/400 |

FOREIGN PATENT DOCUMENTS 58-9013  1/1983  Japan .

*Primary Examiner*—Russel E. Adams
*Attorney, Agent, or Firm*—Frishauf, Holtz, Goodman & Woodward

[57] ABSTRACT

An automatic focusing camera includes a first distance measurement circuit for measuring a first distance to an object located at a central portion of a frame, a second distance measurement circuit for measuring a plurality of second distances to other objects located at a peripheral portion of the frame, a CPU for comparing the first and second distance with a shortest photographing distance of the camera, for, when the first distance is shorter than the shortest photographing distance, selecting the shortest photographing distance as an object distance regardless of the second distance, for, when the first distance is not shorter than the shortest photographing distance and the second distance is shorter than the shortest photographing distance, selecting the first distance as the object distance, and for, when the first and second distances are not shorter than the shortest photographing distance, selecting a shorter one of the first and second distances as the object distance, and a mechanism for focusing a photographing lens on the basis of the object distance selected by the CPU.

20 Claims, 7 Drawing Sheets

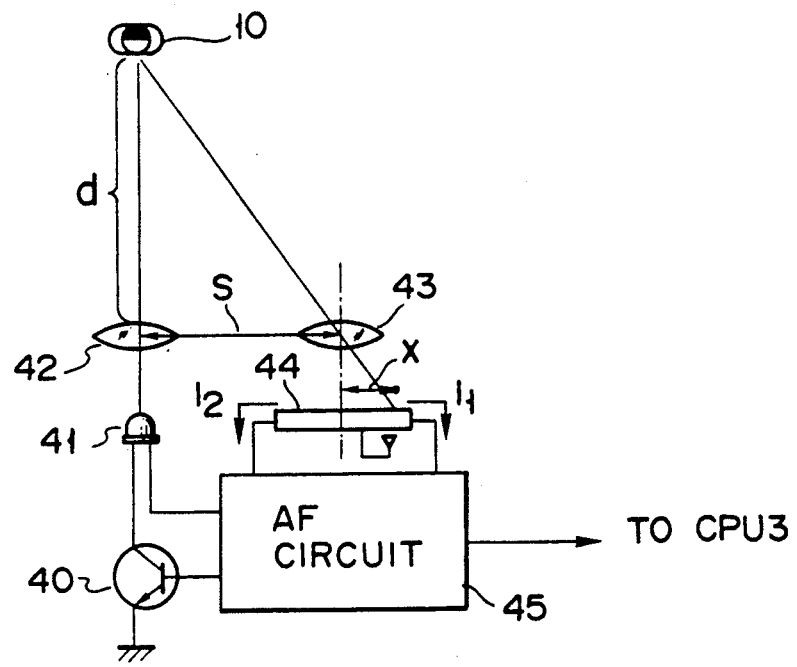
F I G. 6
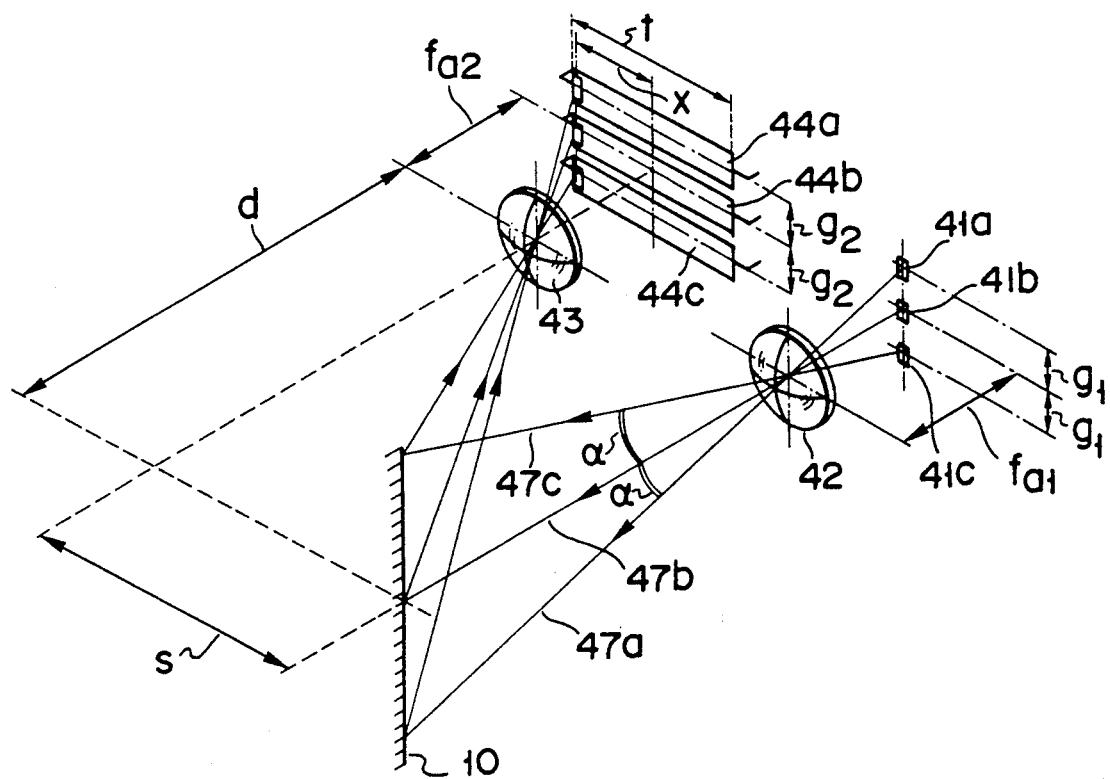
F I G. 7

AUTOMATIC FOCUSING CAMERA WITH MULTIPLE DISTANCE MEASURING FUNCTION

BACKGROUND OF THE INVENTION

1. Field of the Invention

The present invention relates to an automatic focusing camera having a multiple distance measuring function for measuring object distances at a plurality of points in a photographing frame.

2. Description of the Related Art

In general, an automatic focusing (AF) camera detects a distance to an object present at a central portion in the photographing frame, and a photographing lens is moved forward or backward to an in-focus position in accordance with the detected object distance. Therefore, when the object is not present at the central portion of the photographing frame, an out-of-focus state called "central focus error" undesirably occurs. For this reason, another AF camera which comprises a multiple distance measuring function is realized. In this camera, as shown in FIG. 1, distances at a plurality of points in the frame, e.g., a central portion (C), a left portion (L), and a right portion (R), are measured to prevent "central focus error" even when the object is not present at the central portion of the frame. A camera of this type selects shortest distance measurement data from the distance measurement data at the plurality of points in accordance with a statistical probability of presence of a principal object to perform focusing.

In a conventional camera, as shown in FIG. 2, a focusing range of a photographing lens is limited at a nearest side (shortest photographing distance do), and an object located at a position nearer than a position corresponding to this distance cannot be focused. Therefore, in the conventional AF camera which selects the shortest distance measurement data, when an object present outside a photographing range (i.e., d < do) enters a distance measurement point, a photographing operation is performed since the camera recognizes that a principal object is present at that point. However, since the object at that position cannot be focused, a photograph which is in an out-of-focus state is consequently obtained. In order to prevent such an out-of-focus photograph, when an object outside a photographing range enters a distance measurement point, a shortest focusing warning is generated to a photographer, or a release operation is canceled, thereby eliminating a photographing error as much as possible.

When the shortest focusing warning is generated when a photographer comes too close to an object, as shown in FIG. 3, he or she can easily understand a meaning of the warning. However, when a photographer is about to photograph a landscape viewed from a window, as shown in FIG. 1, even if the shortest focusing warning is generated since the distance measurement points L and R catch window frames, the photographer may not be able to immediately understand the meaning of the warning and may lose a good shutter opportunity. In this case, if a release operation is forcibly performed, since the camera recognizes the shortest window frame as a principal object, the landscape cannot be focused, and the window frames outside the photographing range cannot also be focused. As a result, an unsuccessful photograph in an out-of-focus state is taken.

In this manner, when the conventional AF camera which selects the shortest distance measurement data catches an object outside the photographing range at a distance measurement point other than a predetermined portion of the frame, a photographer may lose a shutter chance, and tends to take an unsuccessful photograph.

SUMMARY OF THE INVENTION

It is an object of the present invention to provide an automatic focusing camera which can realize a quick photographing operation, and can minimize an unsuccessful photographing operation caused by an out-of-focus state of a principal object.

An automatic focusing camera of the present invention comprises a distance measurement circuit for measuring a first distance to an object located at a central portion of a frame, and a second distance to another object located at a peripheral portion of the frame, a circuit for comparing the first and second distances with a shortest photographing distance of the camera, an arithmetic circuit for, when the first distance is shorter than the shortest photographing distance, selecting the shortest photographing distance as an object distance, for, when the first distance is not shorter than the shortest photographing distance and the second distance is shorter than the shortest photographing distance, selecting the first distance as the object distance, and for, when the first and second distances are not shorter than the shortest photographing distance, selecting a shorter one of the first and second distances as the object distance, and a mechanism for focusing a photographing lens on the basis of the object distance selected by the arithmetic circuit.

According to the automatic focusing camera of the present invention, when a distance to an object at a central portion in the frame is shorter than the shortest photographing distance of the camera, the photographing lens is focused based on the shortest photographing distance. When the distance to the object at the central portion is not shorter than the shortest photographing distance and a distance to another object at a peripheral portion of the frame is shorter than the shortest photographing distance, the photographing lens is focused based on the distance to the object at the central portion. Thus, a possibility of an out-of-focus state of a principal object is minimized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 6 is a view for explaining the principle of distance measurement of the first embodiment;

FIG. 7 is a perspective view showing in detail a distance measurement mechanism of the first embodiment;

DETAILED DESCRIPTION OF THE PREFERRED EMBODIMENTS

Figure 4:
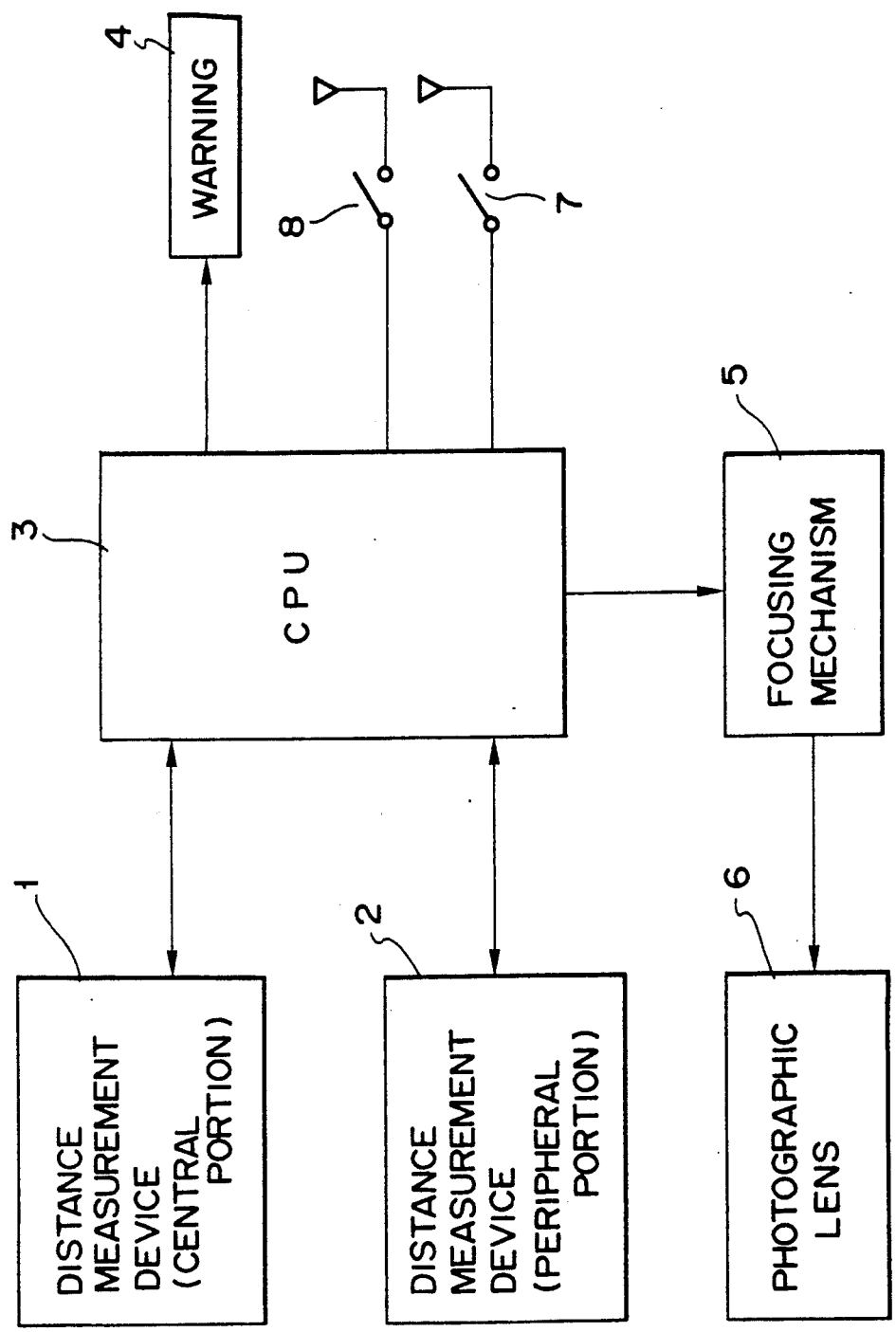
FIG. 4 is a block diagram of the first embodiment of an AF camera according to the present invention.

Preferred embodiments of an AF camera according to the present invention will be described hereinafter with reference to the accompanying drawings. FIG. 4 is a block diagram showing an arrangement of the first embodiment. More specifically, the AF camera comprises a distance measurement device 1 for measuring a distance to an object at a central portion (corresponding to the distance measurement point "C" in FIG. 1) in a finder (frame), and a distance measurement device 2 for measuring a distance to an object at a peripheral portion (corresponding to the distance measurement points "L" and/or "R" in FIG. 1) in the frame. These devices 1 and 2 are connected to an arithmetic circuit (CPU) 3, comprising, e.g., a one-chip microcomputer, for controlling all the sequences of the camera. The CPU 3 recognizes an input from a first release switch 7 which is turned on in response to a half depression of a shutter button, executes time-divisional control of the distance measurement devices 1 and 2, and receives their distance measurement results. The CPU 3 then determines based on these distance measurement data whether or not a principal object is nearer than a closest focusing limit corresponding to the distance do of a focusing range (photographing range) of a photographing lens shown in FIG. 2. When the CPU 3 determines that the object is nearer than the limit, it drives a warning member 4. When the CPU 3 recognizes an input from a second release switch 8 which is turned on in response to a full depression of the shutter button, it controls a focusing mechanism 5 in accordance with the judgment result of the distance measurement data and a calculation result of an amount of forward/backward movement of a photographing lens 6, thereby focusing the photographing lens 6.

The warning member 4 comprises a light-emitting element such as an LED (light-emitting diode) provided in the finder of the camera. The warning member 4 emits light when an object at a central portion of the frame (distance measurement point "C") falls outside a focusing range of the photographing lens 6, i.e., is nearer than the closest focusing limit (do) of the focusing range shown in FIG. 2, thereby warning this state to a photographer.

The focusing mechanism 5 comprises a motor, a driver, an encoder, and the like to execute movement control of the photographing lens 6.

Figure 5:
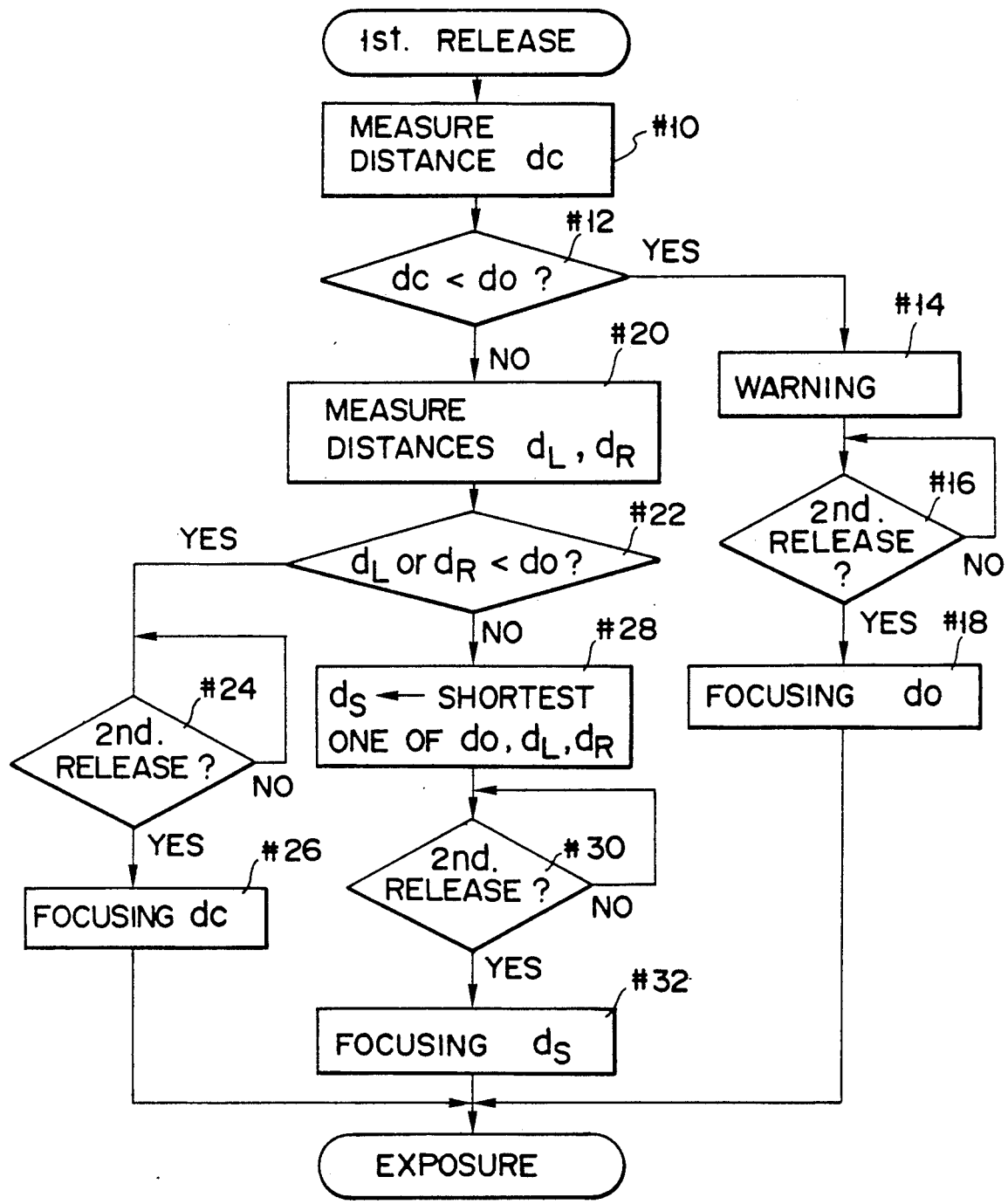
FIG. 5 is a flow chart showing an operation of the first embodiment.

The above-mentioned judgment operation of the distance measurement data of the CPU 3 is shown in the flow chart of FIG. 5. When a photographer depresses the shutter switch to a half position to turn on the first release switch 7, the routine shown in FIG. 5 is started.

In step #10, an object distance at the distance measurement point "C" at the central portion of the frame of the finder is measured by the distance measurement device 1. A distance measurement result dc obtained by the distance measurement device 1 is sent to the CPU 3. In step #12, it is determined whether or not the distance measurement result dc from the distance measurement device 1 is shorter than the shortest focusing limit do of the focusing range of the photographing lens 6, i.e., falls outside a photographing range (dc<do) shown in FIG. 2. If YES in step #12, the warning member 4 is driven to indicate a shortest focusing warning in step #14. In general, a principal object is framed at the central portion of the frame. Therefore, this warning can signal to a photographer that an object cannot be focused. Upon generation of this warning, a finger of the photographer is generally released from the shutter button. After the lapse of a predetermined period of time, the first release routine is ended, and the control returns to a main routine. However, if it is determined in step #16 that the second release switch 8 is turned on since the photographer forcibly depresses the shutter button, the focusing mechanism 5 is controlled to move the photographing lens 6 so as to focus on the object at the shortest focusing limit do of the photographing range so that a degree of out-of-focus of an object at the central portion of the frame is minimized in step #18. After the lens 6 is moved, a normal exposure sequence is started.

Figure 1:
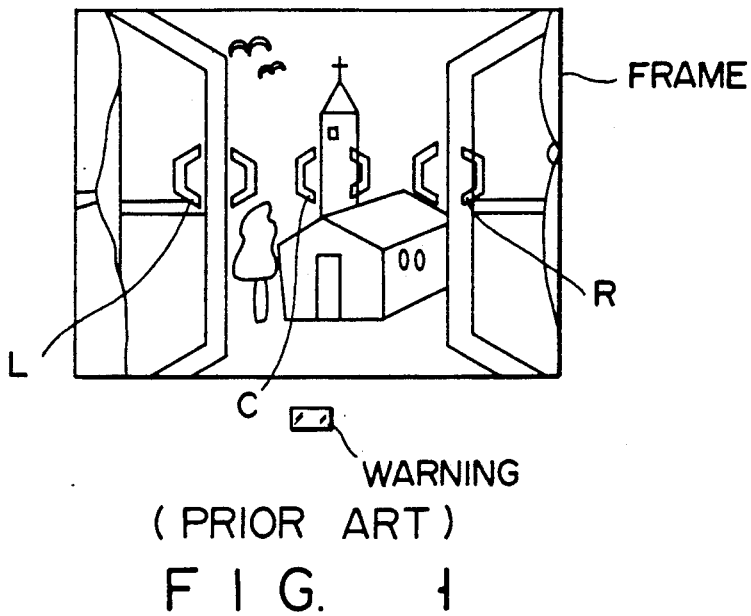
FIG. 1 is a view showing distance measurement points of a conventional three-point distance measurement AF camera.
Figure 2:
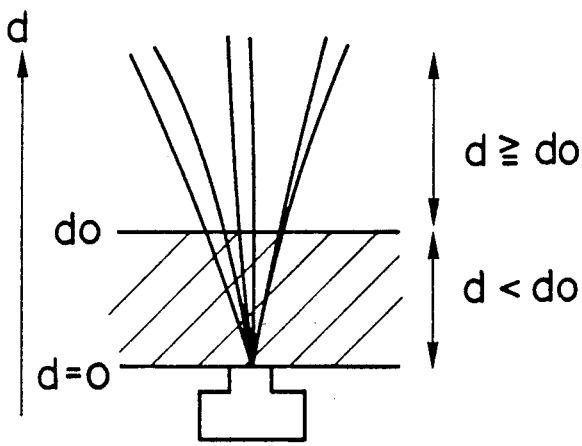
FIG. 2 is a view showing a photographing range of a camera.

If it is determined in step #12 that the central distance measurement result dc by the distance measurement device 1 is not shorter than the shortest focusing limit do of the photographing range, i.e., the object distance dc at the distance measurement point "C" does not fall within the photographing range (dc<do) in FIG. 2, object distances at the distance measurement points "R" and "L" at the peripheral portion of the frame of the finder are measured by the distance measurement device 2 in step #20. Distance measurement results $d_R$ and $d_L$ obtained by the distance measurement device 2 are supplied to the CPU 3. In step #22, it is determined whether or not the distance measurement result $d_R$ or $d_L$ from the distance measurement device 2 is shorter than the shortest focusing limit do of the focusing range of the photographing lens 6, i.e., a photographer wants to take a photograph as shown in FIG. 1. If YES in step #22, i.e., if it is determined that the object distance $d_R$ or $d_L$ at the distance measurement point "R" or "L" falls outside the photographing range shown in FIG. 2 ($d_R$ or $d_L$<do), it is determined in step #24 whether or not an ON signal from the second release switch 8 is received. If YES in step #24, the focusing mechanism 5 is controlled to move the photographing lens 6, so that an object corresponding to the central distance measurement result dc by the distance measurement device 1 is focused in step #26. After the lens 6 is moved, the normal exposure sequence is executed. As a result, a photograph including an object at the distance measurement point "C" at the central portion in the finder as a principal object can be taken.

If it is determined in step #22 that both the distances $d_R$ and $d_L$ fall within the photographing range ($d_R \geq$ do and $d_L \geq$ do), since the central distance measurement result dc by the distance measurement device 1 and peripheral distance measurement results $d_L$ and $d_R$ by the distance measurement device 2 are not shorter than the shortest focusing limit do of the focusing range of the photographing lens 6, i.e., the object distances dc, $d_L$ and $d_R$ at the distance measurement points "C", "L", and "R" fall within the photographing range shown in FIG. 2, a shortest distance of the peripheral distance measurement results $d_L$ and $d_R$ and the central distance measurement result dc is selected as a shortest distance measurement result $d_S$ in step #28. If it is determined in step #30 that the ON signal of the second release switch 8 is input, the focusing mechanism 5 is controlled to extend the photographing lens 6, so that an object corresponding to the shortest distance measurement result $d_S$ is focused. After the lens 6 is moved, a normal exposure sequence is executed. As a result, a photograph which includes a shortest one of objects at the distance measurement points "L", "C", and "R" as a principal object can be taken.

The distance measurement devices 1 and 2 for performing AF distance measurement shown in FIG. 4 will be described in detail below. In general, an AF system can be roughly classified into two systems. One system is a passive system utilizing luminance distribution data of an object, and the other system is an active system which has a means for projecting light toward an object, and measures a distance based on the light reflected by the object. The camera of this embodiment basically employs an infrared active triangular distance measurement system having an arrangement shown in FIG. 6.

In FIG. 6, infrared light rays emitted from an infrared light-emitting diode (to be abbreviated to as an IRLED hereinafter) 41 are focused by a projection lens 42, and are radiated toward an object 10. Light reflected by the object 10 is focused on a position sensor device (to be abbreviated to as a PSD hereinafter) 44 by a light-receiving lens 43. In this PSD 44, photocurrents I1 and I2 are shunted according to the focusing position, and the shunted photocurrents I1 and I2 are supplied to an AF circuit (IC) 45. The AF circuit 45 pulse drives the IRLED 41 through an IRLED control transistor 40, and supplies distance measurement data based on the photocurrents I1 and I2 from the PSD 44 to the CPU 3.

The optical axis of the light-receiving lens 43 is caused to coincide with the central line of the PSD 44, and this coinciding point is defined as an origin. In this case, if an incidence position of reflected light is represented by x, an inter-principal point distance between the projection lens 42 and the light-receiving lens 43, i.e., a base length is represented by s, and a focal length of the light-receiving lens 43 is represented by fa, an object distance d can be given as follows.

$$d = s \cdot fa / x \quad (1)$$

Both the photocurrents I1 and I2 generated by the PSD 44 according to light emitted from the IRLED 41 and reflected by the object 10 are proportional to the intensity of reflected light. However, a photocurrent ratio I1/I2 does not depend on the intensity of reflected light, and is determined by only the incident position x. Therefore, if the total length of the PSD 44 is represented by t, the photocurrent ratio I1/I2 is given as follows.

$$I1/I2 = \{(t/2) + x\} / \{(t/2) - x\} \quad (2)$$

When equation (1) is substituted in equation (2), the photocurrent ratio I1/I2 is expressed as follows.

$$I1/I2 = \{t + (2s \cdot fa/d)\} / \{t - (2s \cdot fa/d)\} \quad (3)$$

Therefore, when the photocurrent ratio I1/I2 is obtained, the object distance d can be uniquely determined.

Note that FIG. 6 illustrates an arrangement for performing simple one-point measurement for simplifying a description of the principle of distance measurement of the active triangular distance measurement system. FIG. 7 shows an arrangement of optical systems of the distance measurement devices 1 and 2 when the arrangement shown in FIG. 6 is applied to three-point distance measurement.

Figure 3:
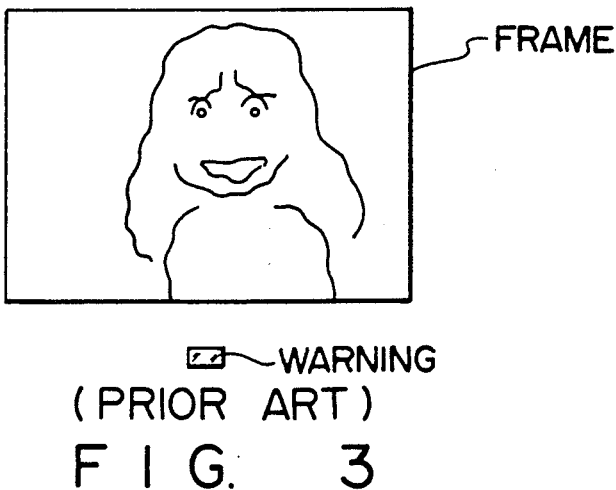
FIG. 3 is a view showing an example of a conventional focusing warning.

In FIG. 7, three PSDs 44a, 44b, and 44c are used in correspondence with three IRLEDs 41a, 41b, and 41c. Distance measurement infrared light beams 47a, 47b, and 47c emitted from the three IRLEDs 41a, 41b, and 41c emerge from the projection lens 42 toward the object 10, and the beams reflected by the object 10 become incident on the corresponding PSDs 44a, 44b, and 44c. In FIG. 7, the projection lens 42 and the light-receiving lens 43 are illustrated to be horizontally arrayed for the sake of easy understanding of the overall arrangement. However, in practice, the horizontal arrangement shown in FIG. 7 must be changed to be a vertical arrangement. More specifically, the projection lens 42 and the light-receiving lens 43 must be arranged in the vertical direction, so that the infrared beams emitted from the three IRLEDs 41a, 41b, and 41c are caused to correspond to the distance measurement points "L", "C", and "R" in the field of view in the finder shown in FIG. 3.

In a detailed arrangement of optical systems in these distance measurement devices 1 and 2, an angle $\alpha$ defined by the infrared beam 47b emitted from the central IRLED 41b and the infrared beam 47a or 47c emitted from the left or right IRLED 41a or 41c is determined to be about 7°. If an interval between two adjacent ones of the IRLEDs 41a, 41b, and 41c is represented by g1 and a focal length of the projection lens 42 is represented by fa1, the optical system is designed to satisfy the following equation.

$$\tan \alpha = g1/fa1 \quad (4)$$

Assuming that an interval between two adjacent ones of the PSDs 44a, 44b, and 44c is represented by g2 and a focal length of the light-receiving lens 43 is represented by fa2, the interval g1 between two adjacent ones of the IRLEDs 41a, 41b, and 41c and the interval g2 between two adjacent ones of the PSDs 44a, 44b, and 44c are set to satisfy the relation of g1 = g2 if the focal lengths of the lenses 42 and 43 are determined to satisfy fa1 = fa2.

Three PSDs are used in order to minimize the influence of incident light from other directions during one-point distance measurement, thereby improving an S/N ratio.

Figure 8:
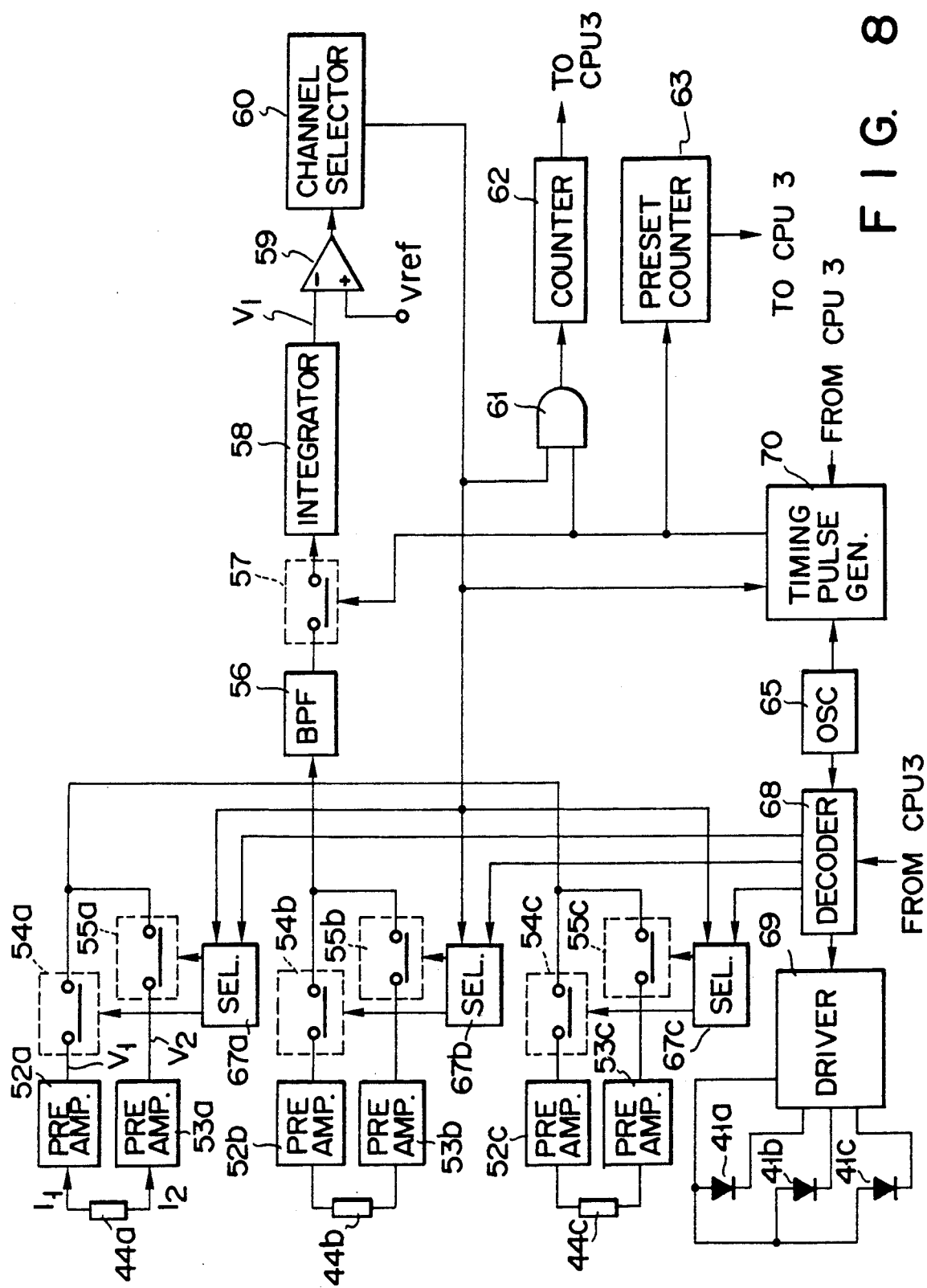
FIG. 8 is a circuit diagram of a distance measurement circuit of the first embodiment.

FIG. 8 shows a detailed electrical circuit of the AF circuit 45 connected to the three IRLEDs and the three PSDs. The photocurrents I1 and I2 from the PSD 44a are respectively converted to voltage signals V1 and V2, i.e., voltages corresponding to light incidence positions to the PSD 44a by preamplifiers 52a and 53a. The voltage signals V1 and V2 are then supplied to channel selection switches 54a and 55a. The channel selection switches 54a and 55a are controlled by a channel selection signal supplied from a channel selector 60 (to be described later) through a selector 67a.

It is noted that the circuits for the remaining PSDs 44b and 44c have the same arrangement as described above. In FIG. 8, reference numerals of circuit components for the PSD 44b are added with "b", and those for the PSD 44c are added with "c".

The circuits corresponding to the three PSDs 44a, 44b, and 44c are selectively controlled in accordance with a selection signal from a decoder 68 to the selectors 67a, 67b, and 67c. The decoder 68 supplies a drive pulse signal having a predetermined frequency from an oscillator 65 to a driver 69 for causing the three IRLEDs 41a, 41b, and 41c to intermittently emit light pulses. The decoder 68 performs selection control between one-point distance measurement and three-point distance measurement for the driver 69 in response to a selection instruction from the CPU 3, and also performs selection control among three PSD circuits by using the selectors 67a, 67b, and 67c. More specifically, an AF sequence in a three-point distance measurement mode is time-divisionally executed to perform distance measurement calculations by the common AF circuit 45. When the IRLED 41a emits light, only the outputs from the PSD 44a are processed. When the IRLED 41b emits light, only the outputs from the PSD 44b are processed. When the IRLED 41c emits light, only the outputs from the PSD 44c are processed.

In each of the circuits for the three PSDs 44a, 44b, and 44c, one of the voltage signals V1 and V2 is time-divisionally supplied to a band-pass filter (to be abbreviated to as a BPF hereinafter) 56 in accordance with the logic level of the channel selection signal from the channel selector 60. The BPF 56 allows only the same frequency component as the frequency of the drive pulse signal generated by the oscillator 65 to selectively pass therethrough. That is, the BPF 56 allows a signal component obtained by removing background light from a light signal from each PSD and photoelectrically converting only an effective light component reflected by the object to pass therethrough.

An integration switch 57 supplies the filtered output of the BPF 56 to an integrator 58 in synchronism with a signal from an integration timing pulse generator 70. An integrated output VI from the integrator 58 is input to a comparator 59 and is compared with a reference voltage Vref. The output from the comparator 59 is supplied to the channel selector 60 comprising, e.g., a D-type flip-flop. The channel selection signal output from the channel selector 60 is supplied to the selectors 67a, 67b, and 67c, thereby controlling the two channel selection switches in each PSD circuit, e.g., the channel selection switches 54a and 55a in the circuit for the PSD 44a.

The channel selection signal from the channel selector 60 is also supplied to an AND gate 61 for controlling an input pulse to a counter 62 which counts a positive integration count, and the integration timing pulse generator 70. The positive integration counter 62 incorporates a shift register, and counts a synchronous integration count upon positive integrations when the channel selection signal from the channel selector 60 goes to "H" level to enable the AND gate 61 and the channel selection switches 54a, 54b, and 54c are turned on. Upon completion of an AF operation, the counter 62 transfers AF data (positive integration count) from the internal shift register to the CPU 3.

A total integration counter 63 comprising, e.g., a preset counter counts a total of synchronous integrations, i.e., the number of timing pulses generated by the integration timing pulse generator 70. When the count value reaches a setup value, the counter 63 supplies an end signal for ending the AF processing to the CPU 3.

The operation of the AF circuit shown in FIG. 8 will be briefly described below. The AF operation is started when the AF circuit 45 receives an AF start signal and a reference clock signal from the CPU 3. A description will be made about the IRLED 41a and the PSD 44a. When the IRLED 41a starts to emit light pulses, a ratio of peak values of voltage waveforms of the output voltages V1 and V2 from the preamplifiers 52a and 53a which receive the photocurrents I1 and I2 from the PSD 44a which receives light reflected by the object is equal to the above mentioned photocurrent ratio I1/I2.

Upon reception of the AF start signal, the channel selector 60, the positive integration counter 62, and the total integration counter 63 are reset. In this case, since the channel selection signal from the channel selector 60 is at "L" level, the channel selection switch 54a is turned off, and the switch 55a is turned on. Thus, the voltage V2 proportional to the photocurrent I2 is supplied to the BPF 56.

When the integration switch 57 is turned on in response to the timing pulse from the integration timing pulse generator 70, the BPF 56 supplies a voltage proportional to the photocurrent I2 to the integrator 58. Therefore, the integrated output VI from the integrator 58 is obtained by performing integration (inverse integration) at a positive peak of the filter output signal from the BPF 56. When the integrated output VI becomes lower than the reference voltage Vref, the output from the comparator 59 changes from "L" level to "H" level, and the channel selection signal from the channel selector 60 goes from "L" level to "H" level in synchronism with the timing pulse. Thus, the channel selection switch 54a is turned on, and the switch 55a is turned off in turn, and the voltage V1 based on the photocurrent I1 is input to the BPF 56 in place of the photocurrent I2. In this case, since the integration timing pulse generator 70 outputs a timing pulse obtained by delaying the frequency of the IRLED drive pulse signal by half a cycle from that when the channel selection switch 55a is turned on, integration (positive integration) is executed at a negative peak of the filter output signal from the BPF 56.

In this manner, every time the integrated output VI exceeds the reference voltage Vref, signals proportional to the photocurrents I1 and I2 are integrated in a direction to approach the reference voltage Vref and in opposite directions.

If a total integration count is represented by No, the relationship between a positive integration count Np and an inverse integration count Ni is expressed as follows.

$$No = Ns + Ni \quad (5)$$

The relationship between the positive integration count Np and the total integration count No is expressed as follows.

$$Np = \{I2/(I1+I2)\}No \quad (6)$$

When equation (3) is substituted in equation (6), the following equation is obtained.

$$Np = \{(\tfrac{1}{2}) - (s \cdot fa/d \cdot t)\}No \quad (7)$$

Therefore, since the total integration count No counted by the total integration counter 63 is always kept constant, the object distance is obtained from the positive integration count Np counted by the positive integration counter 62. That is, from equation (7), the object distance d is given as follows.

$$d = (s \cdot fa/t)\{(\tfrac{1}{2} - Np/No)\} \qquad (8)$$

The equation (8) is calculated by the CPU 3.

For example, assuming that the total integration count No is 512, the base length s is 50 mm, the focal length fa of the light-receiving lens 43 is 14 mm, and the total length t of the PSD 44a is 3 mm, when the object distance d is 70 cm, the AF circuit 45 outputs AF data which represents that the positive integration count Np=85 from equation (7). The positive integration count Np is decreased as the object distance d is decreased.

In this manner, in a camera which comprises the photographing lens 6 which cannot focus on an object having an object distance d shorter than 70 cm, the CPU 3 determines that the positive integration count Np is smaller than 85 (Np<85), thereby checking distance measurement data, e.g., determining whether or not the distance measurement results dc, $d_L$, and $d_R$ by the distance measurement devices 1 and 2 are shorter than the shortest focusing limit do of the focusing range of the photographing lens 6. In this case, a time lag upon calculation of equation (8) can be advantageously eliminated.

As described above, according to the first embodiment, there can be provided a camera for measuring distances to a plurality of objects in the frame, which even when an object is not located at the central portion of the frame of the finder, measures object distances at the peripheral portion of the frame, thereby preventing an out-of-focus state called "central focus error". In this camera, when an object is present at a position nearer than the closest limit position of a focusing range of the photographing lens, if this object is present at the central portion of the frame of the finder, this object is determined as a principal object, and a shortest focusing warning is generated. If this object is present at the peripheral portion of the frame, it is determined that the object is not a principal object, and an object present at the central portion of the frame is focused. Thus, even when an object other than the principal object is at the peripheral portion of the frame and requires a shortest focusing warning, a photograph in which the object at the central portion of the frame is in a in-focus state can be taken. Therefore, quick photographing characteristics can be improved, and an unsuccessful photograph in an out-of-focus state can be avoided as much as possible.

In the first embodiment, if it is determined in step #22 that the object distance $d_L$ or $d_R$ corresponding to the distance measurement points "L" or "R" at the peripheral portion of the frame falls outside the photographing range of the lens ($d_L$<do or $d_R$<do), an object at the central portion of the frame is focused in step #26. Alternatively, only when it is determined that both the object distances $d_L$ and $d_R$ at the distance measurement points "L" and "R" fall outside the photographing range of the lens ($d_L$<do and $d_R$<do), an object at the central portion of the frame may be focused. In this case, if one of the distances $d_L$ and $d_R$ falls outside the photographing range, the shortest distance between the distances other than that one of the distances is selected in step #28. The number of peripheral distance measurement points is not limited to two, i.e., "L" and "R", but may be one, or three or more. Further, in step #28, it is possible to select the shortest distance after weighting the distances dc, $d_L$, and $d_R$.

Figure 9:
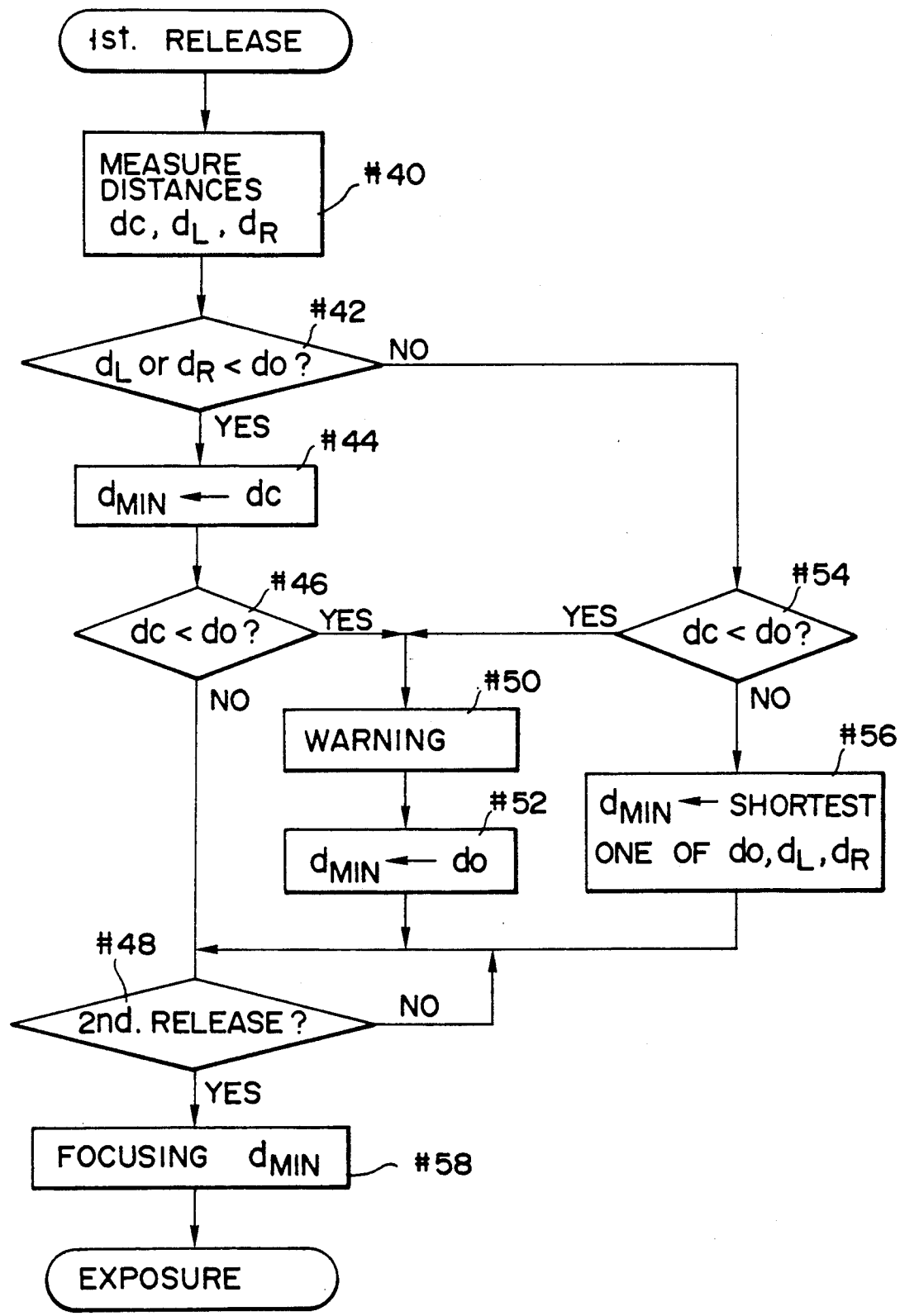
FIG. 9 is a flow chart showing an operation of the second embodiment.

The second embodiment will be described below. Since the arrangement of the second embodiment is the same as that of the first embodiment, a block diagram and the like will be omitted. FIG. 9 shows the flow chart of the second embodiment. In step #40, an object distance at the distance measurement point "C" of the frame of the finder is measured by the distance measurement device 1, and object distances at the distance measurement points "L" and "R" at the peripheral portion of the frame of the finder are measured by the distance measurement device 2. The distance measurement results dc, $d_L$, and $d_R$ by these distance measurement devices 1 and 2 are supplied to the CPU 3. In step #42, it is determined whether or not the distance measurement result $d_L$ or $d_R$ from the distance measurement device 2 is shorter than the shortest focusing limit do of the focusing range of the photographing ens 6, i.e., object distance $d_L$ or $d_R$ at the distance measurement point "L" or "R" falls outside the photographing range shown in FIG. 2 ($d_L$<do or $d_R$<do). If it is determined in step #42 that both the object distances fall outside the photographing range, the distance measurement result dc from the distance measurement device 1 is stored in an object distance register $d_{MIN}$ in step #44. In step #46, it is determined whether or not the central distance measurement result dc is shorter than the shortest focusing limit do of the focusing range of the photographing lens 6, i.e., the object distance dc at the distance measurement point "C" falls outside the photographing range shown in FIG. 2 (dc<do). If it is determined in step #46 that the object distance dc falls within the photographing range, the control waits for an ON operation of the second release switch 8 in step #48.

If it is determined in step #46 that the object distance dc at the measurement point "C" falls outside the photographing range shown in FIG. 2 (dc<do), the warning member 4 is driven to indicate a shortest focusing warning in step #50. In step #52, the shortest focusing limit do of the photographing range is stored in the object distance register $d_{MIN}$. In step #48, the control waits for an ON operation of the second release switch 8.

If it is determined in step #42 that both the object distances $d_L$ and $d_R$ at the distance measurement points "L" and "R" fall within the photographing range, it is determined in step #54 if the central distance measurement result dc is shorter than the shortest focusing limit do of the focusing range of the photographing lens 6, i.e., the object distance dc at the distance measurement point "C" falls within the photographing range shown in FIG. 2 (dc<do). If it is determined in step #54 that the distance dc falls outside the photographing range, a warning is generated in step #50, and the shortest focusing limit do of the photographing range is stored in the object distance register $d_{MIN}$ in step #52.

If it is determined in step #54 that dc<do is not satisfied, since all of central distance measurement result de by the distance measurement device 1 and the peripheral distance measurement results $d_L$ and $d_R$ by the distance measurement device 2 are not shorter than the shortest focusing limit do of the focusing range of the photographing lens 6, i.e., the object distances do, $d_L$, and $d_R$ at the distance measurement points "C", "L" and "R" fall within the photographing range shown in FIG. 2, a shortest distance of the peripheral distance measurement results $d_L$ and $d_R$ and the central distance measurement result dc is stored in the object distance register $d_{MIN}$ in step #56. In step #48, the control waits for an ON operation of the second release switch 8.

When it is determined in step #48 that the ON signal from the second release switch 8 is input, the focusing mechanism 5 is controlled to move the photographing lens 6, so that an object located in the distance stored in the object distance register $d_{MIN}$ is focused in step #58. After the lens 6 is moved, a normal exposure sequence is executed.

According to the second embodiment having the above-mentioned operation flow, there can be provided an AF camera for measuring distances to a plurality of objects in a frame, which can select an optimal distance measurement result as in the first embodiment, and can minimize a possibility of an out-of-focus state of a principal object.

In the second embodiment, if it is determined in step #42 that the object distance $d_L$ or $d_R$ corresponding to the distance measurement points "L" or "R" at the peripheral portion of the frame falls outside the photographing range of the lens ($d_L < do$ or $d_R < do$), an object at the central portion of the frame is selected in step #44. Alternatively, only when it is determined that both the object distances $d_L$ and $d_R$ at the distance measurement points "L" and "R" fall outside the photographing range of the lens ($d_L < do$ and $d_R < do$), an object at the central portion of the frame may be focused. In this case, if one of the distances $d_L$ and $d_R$ falls outside the photographing range, the shortest distance between the distances other than that one of C the distances is selected in step #56. The number of peripheral distance measurement points is not limited to two, i.e., "L" and "R", but may be one, or three or more. Further, in step #56, it is possible to select the shortest distance after weighting the distances dc, $d_L$, and $d_R$.

In the above embodiment, the distance measurement points include a central portion but need not always include a truly central portion.

Figure 10:
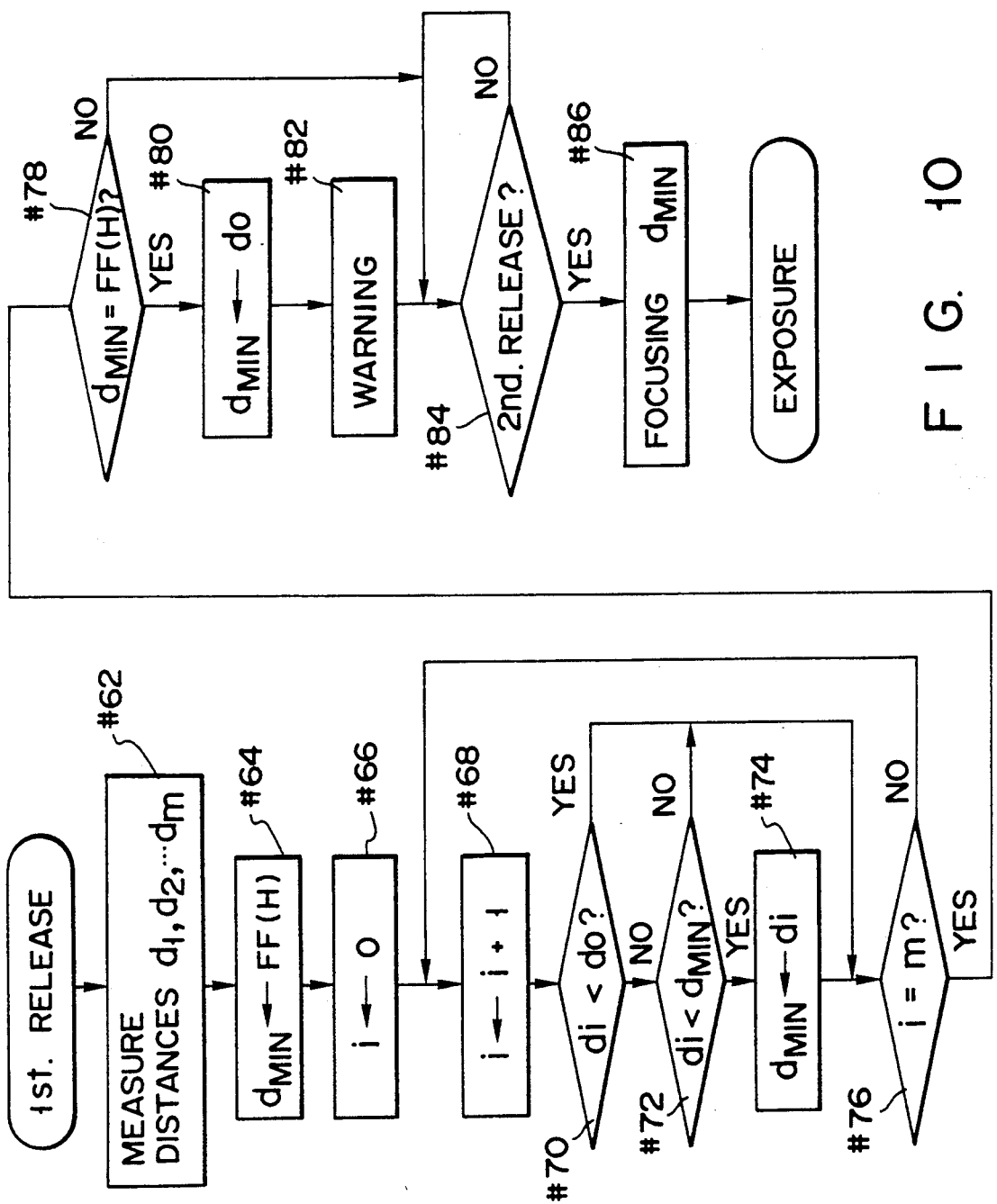
FIG. 10 is a flow chart showing an operation of the third embodiment.

The third embodiment for measuring distances to a plurality of points in the frame will be described below. FIG. 10 is a flow chart showing an operation of the third embodiment. In step #62, distances d1, d2, ... dm to objects at a plurality of distance measurement points are measured. In step #64, $FF_H$ is substituted in an object distance register $d_{MIN}$. The value "FF" is a value (object distance) larger than an infinity, and is not generated in general.

A variable i for counting the distance measurement points is set to be 1 in steps #66 and #68 to select distance measurement data d1. It is determined in step #70 whether or not this selected data d1 is smaller than the shortest focusing limit do of the photographing range. If d1 < do is not satisfied, it is determined in step #72 whether or not the selected data d1 is smaller than the data in the object distance register $d_{MIN}$. Since the selected data d1 is smaller than $d_{MIN}$ (=FF), the selected data d1 is stored in the object distance register $d_{MIN}$ in step #74, and the flow advances to step #76. If it is determined in step #72 that d1 < $d_{MIN}$ is not satisfied, the flow immediately advances to step #76. It is then determined in step #76 whether or not the processing is executed for all the distance measurement points, i.e., i reaches m. If NO in step #76, the flow returns to step #68, and i is incremented by one to repeat the above mentioned processing.

If YES in step #76, it is determined in step #78 whether or not the data in the object distance register $d_{MIN}$ is FF, i.e., all the distance measurement results are shorter than do. If NO in step #78, the control waits for an ON operation of the second release switch in step #84. However, if YES in step #78, the shortest photographing distance do is substituted in the object distance register $d_{MIN}$ in step #80. In step #82, a shortest focusing warning is generated, and in step #84, the control waits for an ON operation of the second release switch. Thus, the object distance register $d_{MIN}$ stores the smallest distance of those longer than the shortest photographing distance.

If the ON operation of the second release switch is detected in step #84, the lens is focused based on the data stored in the object distance register $d_{MIN}$ in step #86, and thereafter, the exposure routine is executed.

According to the present invention, since distances to a plurality of points in the frame are measured, and a focusing operation is performed on the basis of a smallest distance excluding distances shorter than the shortest photographing distance, an object which cannot be easily focused by a conventional multiple distance measuring type AF camera of a shortest focusing data selection system can be easily focused.

As described above, according to the present invention, there can be provided an AF camera which can improve quick photographing characteristics and can minimize unsuccessful photographs caused by an out-of-focus state of a principal object.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An automatic focusing camera, comprising:

first distance measurement means for measuring a first distance to an object located at a central portion of a frame of a camera, said camera having a shortest photographing distance at which an object can be focused by a photographing lens of the camera;

second distance measurement means for measuring a second distance to another object located at a peripheral portion of said frame;

arithmetic circuit means including
  means for comparing the first and the second distances with the shortest photographing distance of said camera;
  first selection means for, when the first distance is shorter than the shortest photographing distance, selecting the shortest photographing distance as an object distance for the object located at the central portion of said frame;
  second selection means for, when the first distance is not shorter than the shortest photographing distance and the second distance is shorter than the shortest photographing distance, selecting the first distance as the object distance; and
  third selection means for, when the first and the second distances are not shorter than the shortest photographing distance, selecting one of the first and the second distances as the object distance; and means coupled to said arithmetic circuit means for focusing the photographing lens on the basis of the object distance selected by one of said first to third selection means to enable the camera to carry out an exposure sequence.

2. The camera according to claim 1, in which said third selection means comprises means for selecting a shorter one of the first and the second distances.

3. A focusing method of an automatic focusing camera comprising first distance measurement means for measuring a first distance to an object located at a central portion of a frame of the camera, wherein the camera has a shortest photographing distance at which an object can be focused by a photographing lens of the camera, second distance measurement means for measuring a second distance to another object located at a peripheral portion of said frame, and means for focusing the photographing lens on the basis of the first and second measured distances, the method comprising the steps of:

measuring the first distance using said first distance measurement means;

comparing the first distance with the shortest photographing distance of said camera;

measuring the second distance using said second distance measurement mean when the first distance is not shorter than the shortest photographing distance;

comparing the second distance with the shortest photographing distance of said camera;

focusing the photographing lens by
performing focusing on the basis of the first distance when the second distance is shorter than the shortest photographing distance, and
performing focusing on the basis of one of the first and the second distances when the second distance is not shorter than the shortest photographing distance; and 4. The method according to claim 3, in which said focusing step comprises the substep of performing focusing on the basis of a shorter one of the first and the second distances when the second distance is not shorter than the shortest photographing distance.

5. The method according to claim 3, further comprising the steps of:

generating a warning when the first distance is shorter than the shortest photographing distance; and performing focusing on the basis of the shortest photographing distance when a shutter is released during generation of the warning.

6. An automatic focusing camera, comprising:
first distance measurement means for measuring a first distance to an object located at a central portion of a frame of a camera, said camera having a shortest photographing distance at which an object can be focused by a photographing lens of the camera;
arithmetic circuit means including first comparison means for comparing the first distance with the shortest photographing distance of said camera;
second distance measurement means for measuring a second distance to another object located at a peripheral portion of same frame;
said arithmetic circuit means also including second comparison means for comparing the second distance with the shortest photographing distance of said camera;

selection means for, when the first distance is not shorter than the shortest photographing distance and the second distance is shorter than the shortest photographing distance, selecting the first distance as an object distance; and calculation means for, when the first distance and the second distance are not shorter than the shortest photographing distance, calculating the object distance on the basis of the first and the second distances; and means coupled to said arithmetic circuit means for focusing said photographing lens on the basis of the object distance output from one of said selection means and said calculation means to enable the camera to carry out an exposure sequence.

7. The camera according to claim 6, in which said calculation means comprises means for selecting a shorter one of the first and the second distances as the object distance.

8. The camera according to claim 6, further comprising:

means for, when the first distance is shorter than the shortest photographing distance, generating a warning; and means for, when a shutter is released during generation of the warning, performing focusing on the basis of the shortest photographing distance.

9. An automatic focusing camera, comprising:
first distance measurement means for measuring a first distance to an object located at a central portion of a frame of a camera, said camera having a shortest photographing distance at which an object can be focused by a photographing lens of the camera;
second distance measurement means for measuring a second distance to another object located at a peripheral portion of said frame;
arithmetic circuit means including means for comparing the second distance with the shortest photographing distance of said camera; and
means coupled to said arithmetic circuit means for, when the second distance is shorter than the shortest photographing distance, focusing the photographing lens on the basis of the first distance to enable the camera to carry out an exposure sequence.

10. An automatic focusing camera for measuring a first distance to an object located at a central portion of a frame of the camera, wherein the camera has a shortest photographing distance at which an object can be focused by a photographing lens of the camera, and a second distance to another object located at a peripheral portion of said frame, and performing focusing on the basis of the first and the second distances, the camera comprising:

arithmetic circuit means including means for comparing the first and the second distances with the shortest photographing distance of said camera; and means coupled to said arithmetic circuit means for, when one of the first and the second distances is shorter than the shortest photographing distance, focusing the photographing lens on the basis of the first distance to enable the camera to carry out an exposure sequence.

11. An automatic focusing camera, comprising:
means for measuring a first distance to an object located at a central portion of a frame of the camera, wherein the camera has a shortest photographing distance at which an object can be focused by a photographing lens of the camera, and a second distance to another object located at a peripheral portion of said frame;
arithmetic circuit means including means for comparing the first and the second distances with the shortest photographing distance of said camera; and
means coupled to said arithmetic circuit means for focusing the photographing lens on the basis of a smaller one of the first and the second distances which is not shorter than the shortest photographing distance.

12. An automatic focusing camera, comprising:
first distance measurement means for measuring a first distance to an object located at a central portion of a frame of the camera, the camera having a photographing lens, and outputting first distance data;
second distance measurement means for measuring a second distance to another object located at least at one position of a peripheral portion of said frame, and outputting second distance data;
calculation means for receiving the first and the second distance data and calculating a position of said photographing lens on the basis of the input data, said calculation means including means for comparing the first and the second distance data with a predetermined value, calculating the position of the photographing lens in accordance with the predetermined value when the first distance data is shorter than the predetermined value, and calculating the position of said photographing lens according to a smallest distance data when the first and the second distance data are not shorter than the predetermined value; and
means coupled to said calculation means for focusing the position of said photographing lens on the basis of an output from said calculation means to enable the camera to carry out an exposure sequence.

13. The camera according to claim 12, in which the predetermined value is a shortest photographing distance at which an object can be focused by the photographing lens of said camera.

14. The camera according to claim 12, further comprising means for, when the first distance data is shorter than the predetermined value, generating a warning to a photographer.

15. An automatic focusing camera, comprising:
first distance measurement means for measuring a first distance to an object located at a central portion of a frame of the camera, the camera having a photographing lens, and outputting first distance data;
second distance measurement means for measuring a second distance to another object located at least at one position of a peripheral portion of said frame, and outputting second distance data;
arithmetic circuit means including means for comparing the first and the second distance data with a predetermined value; and
means for, when the second distance data is shorter than the predetermined value, selecting the first distance data as an object distance data, and for, when the first distance data is shorter than the predetermined value, selecting the predetermined value as the object distance data; and
means coupled to said arithmetic circuit means for focusing said photographing lens in accordance with the object distance data to enable the camera to carry out an exposure sequence.

16. The camera according to claim 15, in which the predetermined value is a shortest photographing distance at which an object can be focused by the photographing lens of the camera.

17. The camera according to claim 15, further comprising means for, when the first distance data is shorter than the predetermined value, generating a warning to a photographer.

18. An automatic focusing camera, comprising:
means for measuring a first distance to an object located at a central portion of a frame of the camera, the camera having a photographing lens, and a second distance to another object located at a peripheral portion of said frame and outputting first and second distance data;
arithmetic circuit means including means for comparing the first and the second distance data with a predetermined value, and means for selecting one of the first and the second distance data in accordance with a comparison result; and
means coupled to said arithmetic circuit means for focusing said photographing lens in accordance with the selected distance data to enable the camera to carry out an exposure sequence.

19. An automatic focusing camera, comprising:
means for measuring distances to objects at a plurality of points in a frame of the camera, the camera having a shortest photographing distance at which an object can be focused;
arithmetic circuit means including
first comparison means for comparing the plurality of measured distances with the shortest photographing distance of said camera; and
second comparison means for detecting a smallest distance among measured distances longer than the shortest photographing distance; and
means coupled to said arithmetic circuit means for performing focusing on the basis of the distance detected by said second comparison means.

20. The camera according to claim 19, in which when no distance is larger than the shortest photographing distance, said second comparison means outputs the shortest photographing distance as a detection value.

* * * * *